(12) United States Patent
Sarh et al.

(10) Patent No.: US 6,729,809 B2
(45) Date of Patent: May 4, 2004

(54) COMBINED CLAMP AND DRILL GUIDE FOR ELIMINATION OF INTER-LAMINATE BURRS DURING DRILLING

(75) Inventors: Branko Sarh, Huntington Beach, CA (US); Chin Hoi Toh, Orange, CA (US); Chris Erickson, Garden Grove, CA (US); Scott W. Hall, Wentzville, MO (US)

(73) Assignee: The Boeing Company, Seattle, WA (US)

( * ) Notice: Subject to any disclaimer, the term of this patent is extended or adjusted under 35 U.S.C. 154(b) by 203 days.

(21) Appl. No.: 09/973,515

(22) Filed: Oct. 9, 2001

(65) Prior Publication Data

US 2003/0068207 A1 Apr. 10, 2003

(51) Int. Cl.⁷ .............................................. B23B 45/14
(52) U.S. Cl. ........................ 408/1 R; 408/97; 408/103; 408/115 R
(58) Field of Search ........................ 29/34 B; 408/1 R, 408/97, 108, 110, 111, 113, 115 R, 103

(56) References Cited

U.S. PATENT DOCUMENTS

| | | | |
|---|---|---|---|
| 1,682,150 A | * 8/1928 | Sklarek | .................. 408/85 |
| 2,351,243 A | * 6/1944 | Vetter | ........................ 408/97 |
| 3,526,158 A | * 9/1970 | Adams et al. | ............... 408/97 |
| 4,396,183 A | 8/1983 | Lymburner | |
| 4,436,294 A | 3/1984 | Irelan | |
| 4,488,713 A | 12/1984 | Kosmal et al. | |
| 4,496,138 A | 1/1985 | Blatt | |
| 4,521,140 A | * 6/1985 | Doescher et al. | ........... 408/97 |
| 4,570,914 A | 2/1986 | Blatt | |
| 4,601,618 A | * 7/1986 | McEldowney | ............ 408/1 R |
| 4,637,597 A | 1/1987 | McPherson et al. | |
| 4,657,446 A | 4/1987 | Flaten | |
| 4,770,401 A | 9/1988 | Donaldson | |
| 4,773,636 A | 9/1988 | Takahashi | |
| 4,897,000 A | 1/1990 | Suzuki | |
| 4,948,308 A | * 8/1990 | Giannuzzi et al. | ............ 408/97 |
| 4,949,943 A | 8/1990 | Bernstein | |
| 5,033,917 A | 7/1991 | McGlasson et al. | |
| 5,118,088 A | 6/1992 | Sawdon | |
| 5,125,296 A | 6/1992 | Nelson et al. | |
| 5,143,361 A | 9/1992 | McNamara et al. | |
| 5,161,923 A | 11/1992 | Reccius | |
| 5,169,047 A | * 12/1992 | Endres et al. | .................. 227/27 |
| 5,193,789 A | 3/1993 | Tucker | |
| 5,356,245 A | 10/1994 | Hosoi et al. | |
| 5,404,641 A | 4/1995 | Bratten et al. | |
| 5,454,551 A | 10/1995 | Hobday | |
| 5,584,618 A | 12/1996 | Blankenship et al. | |
| 5,704,600 A | 1/1998 | Robinson | |
| 5,806,841 A | 9/1998 | Hebener | |
| 5,888,032 A | * 3/1999 | Jensen | ........................ 408/1 R |
| 5,961,258 A | 10/1999 | Ende et al. | |
| 6,036,412 A | 3/2000 | Dalla | |
| 6,095,507 A | 8/2000 | Brown et al. | |
| 6,105,947 A | 8/2000 | Dykstra | |
| 6,115,898 A | 9/2000 | Sawdon | |
| 6,283,684 B1 | * 9/2001 | Jarvis | ........................ 408/103 |

FOREIGN PATENT DOCUMENTS

| | | |
|---|---|---|
| DE | 40 37 716 C1 | 4/1992 |
| DE | 42 17 860 A1 | 12/1993 |

* cited by examiner

Primary Examiner—Daniel W. Howell
(74) Attorney, Agent, or Firm—Alston & Bird LLP (57) ABSTRACT

A pressure clamp assembly for clamping a plurality of overlapping members together. The pressure clamp includes a pair of compression members attached to a clamp body and driven together by a power source. The power source includes a fluid pressure cylinder that repeatably produces high clamping forces so as to inhibit the production of inter-laminate burrs during drilling. The compression members each include an elongated compression foot that distributes the clamping pressure over a wide area to allow drilling in a relatively wide range of locations. In addition, each compression foot defines a drill bit assembly guide that facilitates accurate hole drilling through multiple overlapping parts.

24 Claims, 8 Drawing Sheets

COMBINED CLAMP AND DRILL GUIDE FOR ELIMINATION OF INTER-LAMINATE BURRS DURING DRILLING

FIELD OF THE INVENTION

The present invention is related to the field of clamping tools, and more particularly, to clamping tools that clamp overlapping work pieces to facilitate drilling of the work pieces.

BACKGROUND OF THE INVENTION

Accurate hole location is critical to the attachment of the parts of an assembly during a manufacturing process. For this reason, overlapping parts are typically drilled while assembled to ensure matching hole configuration. However, burrs tend to develop around the drill holes that interfere with the mating of the parts. These burrs are inaccessibly trapped in the interstices of the overlapping parts while the parts are assembled. Therefore, assembly of the overlapping parts typically requires pre-assembly of the parts, drilling of the holes into the parts, disassembly of the parts, deburring of the drilled holes, the application of sealant between the parts and reassembly of the parts into a final configuration. Assembly, disassembly and reassembly are time consuming processes that slow production.

The formation of burrs can be reduced, or avoided, if sufficient pressure is applied to hold the parts together during drilling. Manual techniques for applying pressure to a parts assembly include the use of conventional clamps, such as C-clamps, and temporary fasteners, such as wedge locks. Despite obviating the need to disassemble and reassemble the parts for deburring, manual clamp deployment still requires significant time and effort on the part of the worker. U.S. Pat. No. 4,770,401 to Donaldson discloses a powered C-clamp that includes an axial clamp member 86 that is movable by a gear 74 which is driven by an electrical drive assembly 16. The powered C-clamp advantageously reduces worker fatigue associated with tightening manual clamps. The aforementioned clamps, however, often do not produce repeatable clamping forces, are prone to excessive tightening which results in damage of the parts, and/or succeed only in producing sufficient clamping forces in a localized area about the clamp jaws. Localized force application limits hole drilling to relatively small areas on the parts in proximity to the clamp.

Therefore, it would be advantageous to have a powered clamp for clamping together parts with sufficient force to eliminate the formation of burrs between parts during drilling. It would be further advantageous to have a powered clamp that eliminates the manual effort associated with clamping the parts. It would also be advantageous to have a clamp that was not prone to excessive tightening and that produced sufficient clamping forces over a relatively wide area.

SUMMARY OF THE INVENTION

The present invention addresses the above needs and achieves other advantages by providing an improved pressure clamp assembly for clamping a plurality of overlapping members together. The pressure clamp includes a pair of compression members attached to a clamp body and driven together by a power source. The power source preferably includes a fluid pressure cylinder that repeatably produces high clamping forces so as to inhibit the production of inter-laminate burrs during drilling. The compression members preferably each include an elongated compression foot that distributes the clamping pressure over a wide area to allow drilling in a relatively wide range of locations. In addition, each compression foot defines a drill bit assembly guide that facilitates accurate hole drilling.

In one embodiment, the present invention includes a pressure clamp assembly for clamping a plurality of overlapping members together and for facilitating accurate drilling of the overlapping members using a drill and a drill bit assembly while minimizing the production of burrs. The pressure clamp assembly includes a clamp body, a first and second compression members and a power source. The compression members are attached to the clamp body. The first compression member is opposingly spaced from the second compression member so as to define a gap. At least one of the compression members is movable toward the other one of the compression members. The first compression member defines a drill bit assembly guide that is configured to receive and guide the drill bit assembly of the drill. The power source is operable to drive the at least one movable compression member so as to shrink the gap and clampingly engage the plurality of overlapping members between the compression members with sufficient pressure to reduce inter-laminate burring during operation of the drill.

In another aspect, the clamp body has a U-shape including a pair of free ends. The first compression member is attached to a first one of the free ends, and the second compression member is attached to a second one of the free ends.

In another aspect, the power source includes a pressure cylinder connected to a fluid pressure supply. The second compression member is attached to a free end of a piston shaft of the pressure cylinder, and is moveable thereby in the direction of the first compression member.

In another embodiment, the power source further includes a pair of second pressure cylinders connected to the pressure supply. The first compression member is connected to a free end of a piston shaft of each of the second pressure cylinders and is moveable thereby in the direction of the second compression member. The pair of second pressure cylinders are preferably spaced across the first compression member. In this configuration, the first one of the free ends of the clamp body defines a drill opening between the pair of second pressure cylinders. The drill opening is configured to allow access of the drill and drill bit assembly through the first one of the free ends to the drill assembly guide.

In another embodiment, the first compression member has an elongated foot shape and the first compression member further defines a second drill bit assembly guide. Preferably, the first and second drill bit assembly guides are spaced across the elongated foot.

In yet another embodiment, the pressure clamp includes a swing mount assembly that connects the second compression member to the body. The swing mount allows the second compression member to swing with respect to the body, and the first compression member. Preferably, the first compression member is an elongated compression foot defining the drill bit assembly guide and the second compression member is a second elongated compression foot defining a second drill bit assembly guide.

In another aspect, the power source includes a pressure cylinder connected to a fluid pressure supply and a linkage attaching a rod of the pressure cylinder to the second compression member to rotate the second compression member about the swing-mount. Preferably, the linkage includes a lever arm rotatably attached at a first end to the rod of the cylinder, rotatably attached at a second end to the second compression member, and rotatably attached between the first and second ends to the body.

In yet another aspect, the swing mount is configured to be detachable from the body via a quick-release pin so as to allow the second compression member to rotate freely about the second end of the lever arm.

In still another aspect, the first compression member further includes a first leg and a first compression foot, wherein the first leg is attached at one end to the body and extends inwards, towards the second compression member, to attach at the other end to the first compression foot. Further, the second compression member includes a second leg and a second compression foot, wherein the second leg is attached at one end to the body and extends inwards, towards the first compression member, to attach at the other end to the second compression foot. Preferably, the first compression foot is parallel to the second compression foot across the gap defined therebetween and each compression foot is rotatable about a long axis of its respective leg.

The present invention has several advantages. The clamp reduces the incidence of interlaminate burring by tightly clamping together the parts being drilled. In addition, the clamp is powered, which reduces operator fatigue. In particular, the air pressure cylinder acts quickly and provides sufficiently high clamping forces to reduce burring. The drill bit assembly guide ensures that the holes are drilled in the area of pressure application and also ensures accurate positioning and orientation of the holes. The use of air pressure cylinders to actuate both of the compression members allows maximum clearance for positioning of the clamp over large parts. The elongated foot shape of the compression members avoids damage to the parts from high pressure areas, as well as distributes the pressure over a large area for drilling multiple holes without repositioning the clamp. The release pin of the swing mount allows the second compression member to be rotated open for additional clearance to position the clamp over large parts. The lever arm of the linkage increases the force applied by the pressure cylinder to the second compression foot.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Several embodiments of a pressure clamp assembly 10 of the present invention are shown in the accompanying Figures. Generally, the pressure clamp assembly 10 includes a clamp body 11, a first compression member 12, a second compression member 13, an air cylinder 14 and a compressed air supply line 15. Pressurized air is supplied by the supply line 15 to the air cylinder 14 which drives the second compression member 13 in the direction of the first compression member 12 to clampingly engage a plurality of overlapping parts, such as a flange 20 and a sheet 21. It is understood, however, that the pressure clamp assembly 10 of the present invention may clampingly engage a wide variety of other parts, if desired.

Figure 1A:
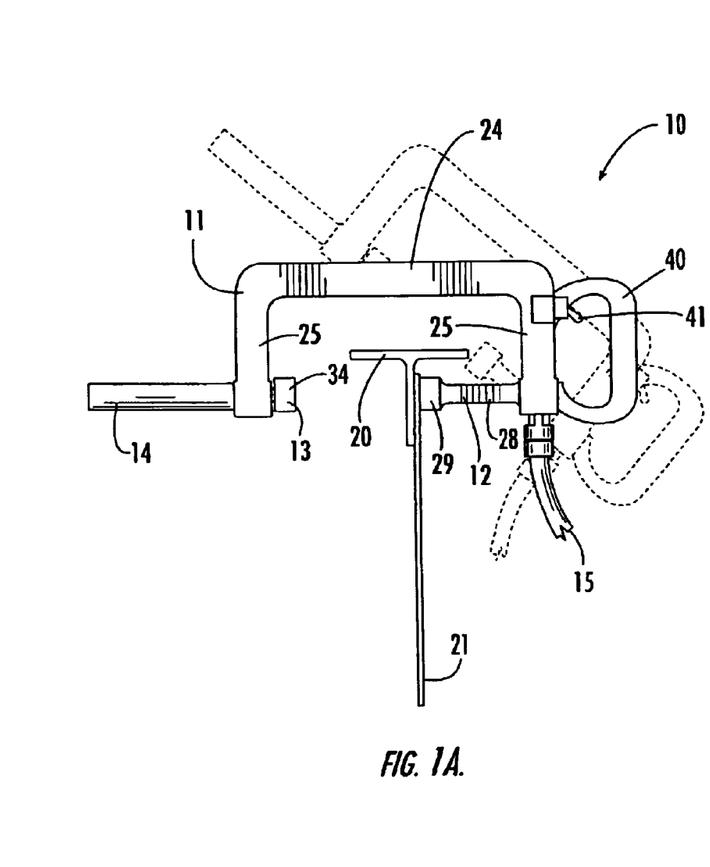
FIGS. 1A and 1B are side elevation views of a first embodiment of the powered clamp of the present invention being used to clamp a flange to a sheet (or web) for hole drilling through the overlapping portions of the flange and sheet.
Figure 1B:
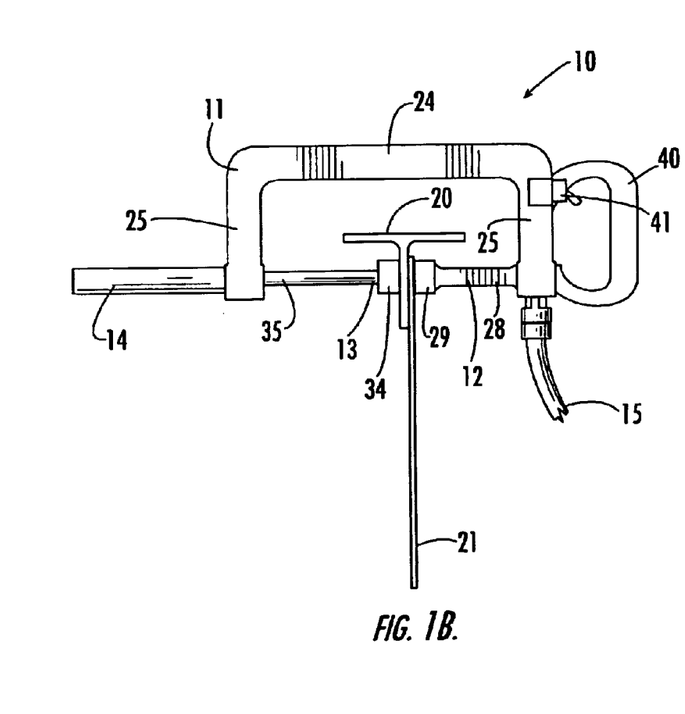
Figure 2:
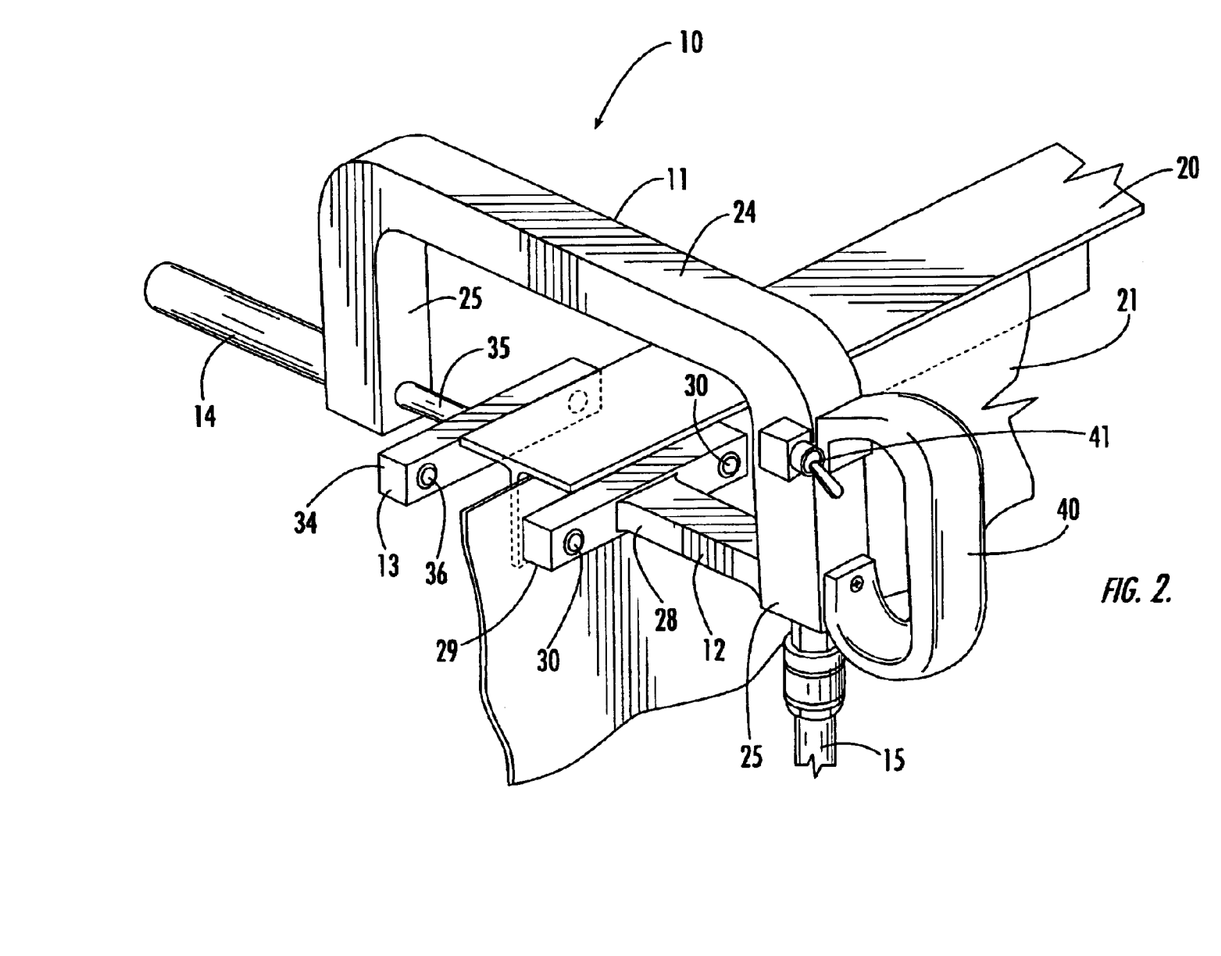
FIG. 2 is a perspective view of the powered clamp of FIG. 1A and 1B.
Figure 3:
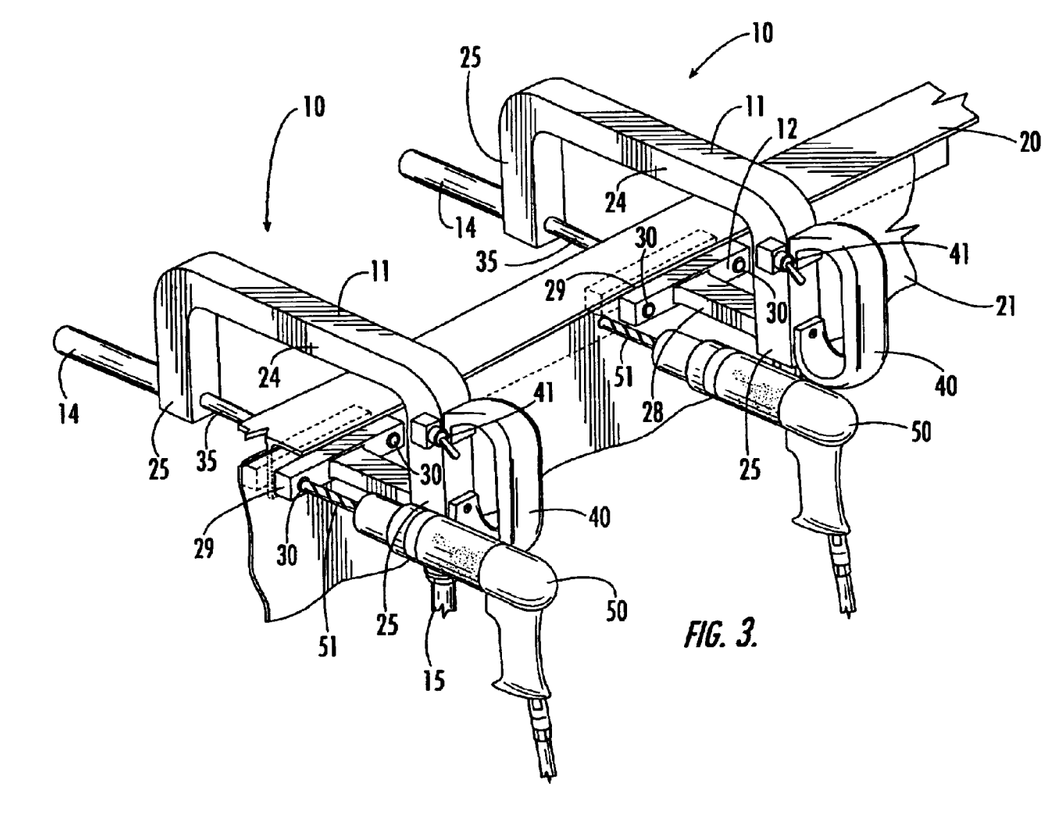
FIG. 3 is a perspective view of a pair of the powered clamps of FIG. 1A and 1B being used to guide the drill bits of a pair of drills.

A first embodiment of the pressure clamp 10 of the present invention is shown in FIGS. 1–3. The clamp body 11 has a "U" or "C" shape that includes a pair of free end portions 25 each spaced apart by, and connected at right angles to, a center portion 24. The compressed air supply line 15 is attached to one of the free end portions 25, while the air cylinder 14 is attached to the other one of the free end portions. Alternatively, the compressed air supply line 15 could also be attached to the same free end portion 25 as the air cylinder, or any other location that allows flow of compressed air to the cylinder 14. Preferably, the body 11 has a tubular cross-section that serves as a conduit for compressed air from the compressed air supply line 15 to the air cylinder 14. In the present embodiment, the body 11 comprises a tube with a rectangular cross section that can be easily manufactured by bending a length of straight tube stock into the U shape. Preferably, the clamp body 11 is constructed of a metal tube stock, such as aluminum, that is light yet strong. It is understood that body 11 can be a machined solid piece, and use external tubing as an air carrier. The length of the center portion 24, and free end portions 25, can vary depending upon the size of the parts typically assembled and the clearance available to assemble them. In the present embodiment, the center portion 24 is relatively long to allow the compression members 12, 13 to clear the flange 20 when in their retracted position.

The first compression member 12 is fixed to its respective one of the free end portions 25 of the body 11 and extends inwards in the direction of the second compression member 13, as shown in FIG. 2. The first compression member 12 includes a first leg 28 attached at one end to the body 11 and extending inwards to attach to a first compression foot 29. The first leg 28 is an elongate member which may have a generally rectangular cross section. The first compression foot 29, in the present embodiment, has an elongate rectangular shape with ends that extend outwards from the plane defined by the long axis of the clamp body 11. A pair of drill bit assembly guides 30 are defined by the first compression foot 29. The guides 30 are spaced apart across the compression foot 29, and are positioned near the ends of the compression foot. However, the guides may be defined at other positions across the compression foot 29. The elongated shape of the first compression foot 29 is preferred due to the distribution of the clamping forces along the vertical web of the flange 20, thereby allowing drilling through the two guides 30 at substantially different locations without burring. Note that the compression foot 29 can also have other shapes depending upon the shape of the parts being clamped, and the desired positioning of the drilled holes.

The second compression member 13 is movable by compressed air with respect to one of the free end portions 25 of the body 11 and extends inwards in the direction of the first compression member 12. The second compression member 13 includes a second compression foot 34 affixed to the end of a piston rod 35 that can be advanced by the air cylinder 14 in the direction of the first compression foot 29, as shown in FIG. 2. Optionally, depending upon the stroke length of the cylinder 14, and the distance between the end portions 25 of the body 11, the second compression member 13 could include a second leg (not shown) affixed to the end of the piston rod 35 and extending the reach of the second compression foot 34.

The second compression foot 34, like the first compression foot 29, may have an elongate rectangular shape with ends that extend outwards from the plane defined by the long axis of the clamp body 11. One or more drill bit assembly guides 36 are defined by the second compression foot 34. The number, positioning, and spacing, of the guides 36 matches that of the guides 30. The matching positioning allows a drill bit to pass through both guides without damaging one of the compression members on the opposite side of the parts being compressed, as shown in FIG. 3. In addition, a drill bit could be inserted on either side of the flange 20 and sheet 21, if needed due to such practicalities as greater available space on one side to maneuver a drill. Preferably, the second compression foot 34 and the first compression foot 29 are similarly shaped to provide optimal compression of the parts. As described above for the first compression foot, the shape of the second compression foot 34 could be varied as desired to compensate for various part shapes.

As described above, the air cylinder 14 receives compressed air from the compressed air supply line 15 which is preferably a supply of shop air commonly found in many manufacturing environments. Preferably, the clamp body 11 further includes a handle 40 that is attached to the outside of one of the free end portions 25, or the center portion 24, and is adjacent to a toggle switch 41, as shown in FIG. 2. The handle 40 includes a thick band of material having a "C" shape that defines a rounded rectangular opening sized to receive the hand of a typical worker. The thick band of the handle is sized and shaped for a comfortable grip by the worker. The toggle switch 41 controls the flow of air from the compressed air supply line 15 into the air cylinder 14. Positioning of the toggle switch 41 adjacent to the handle 40 permits the worker to easily grasp the handle and flip the switch 41 with a single hand. It should be noted that the present invention is not limited to air pressure for actuation of one, or both, of the compression members 12, 13. Other types of fluid pressure, electrical, mechanical, electromechanical actuators and various types of motorized power, such as a DC motor, or solenoid, could be used to actuate the compression members 12, 13. It should also be noted that the use of other types of switches could be possible, such as a trigger coupled with a pistol grip in lieu of the toggle switch 41 and handle 40. Placement of the switch and handle can vary depending upon several factors such as the size and geometry of the clamp body and the parts being clamped, and the amount of clearance for attachment of the clamp assembly 10.

The clamp assembly 10 is employed by retracting the second compression member 13 to increase the gap space between the first and second compression members. As shown by the phantom lines in FIG. 1A, the gap is slipped over the flange 20 and sheet 21 and the compression foot 29 of the first compression member 12 is abutted against the overlapping portions of the flange and sheet. The toggle switch 41 is flipped and pressurized air is released into the body 11 and the air cylinder 14. Pressurized air in the air cylinder urges the piston of the air cylinder, and the attached second compression foot 34, in the direction of the first compression foot 29, as shown in FIGS. 1B and 2. The second compression foot 34 compresses the overlapping portions of the flange 20 and sheet 21 together. This process can be repeated for multiple clamp assemblies, as shown in FIG. 3.

Once the clamps are deployed, the drill bit assembly 51 including a drill bit, and optionally a bushing, is inserted into one of the pair of drill bit assembly guides 30 on the first compression foot 29 (or on the second compression foot 34, as desired). The drill is operated to drill a hole through the overlapping parts and exits through the matching one of the pair of drill bit assembly guides 36. As the drilling is occurring in an area of relatively high clamping pressure, the formation of burrs is inhibited in between the layers of the parts. It should be noted that the present invention is also applicable to multiple layers of parts, such as in multi-layer laminate structures. Also drilling can be performed in areas adjacent the clamp, where clamping pressure is still relatively high, as shown in FIG. 3.

Figure 4:
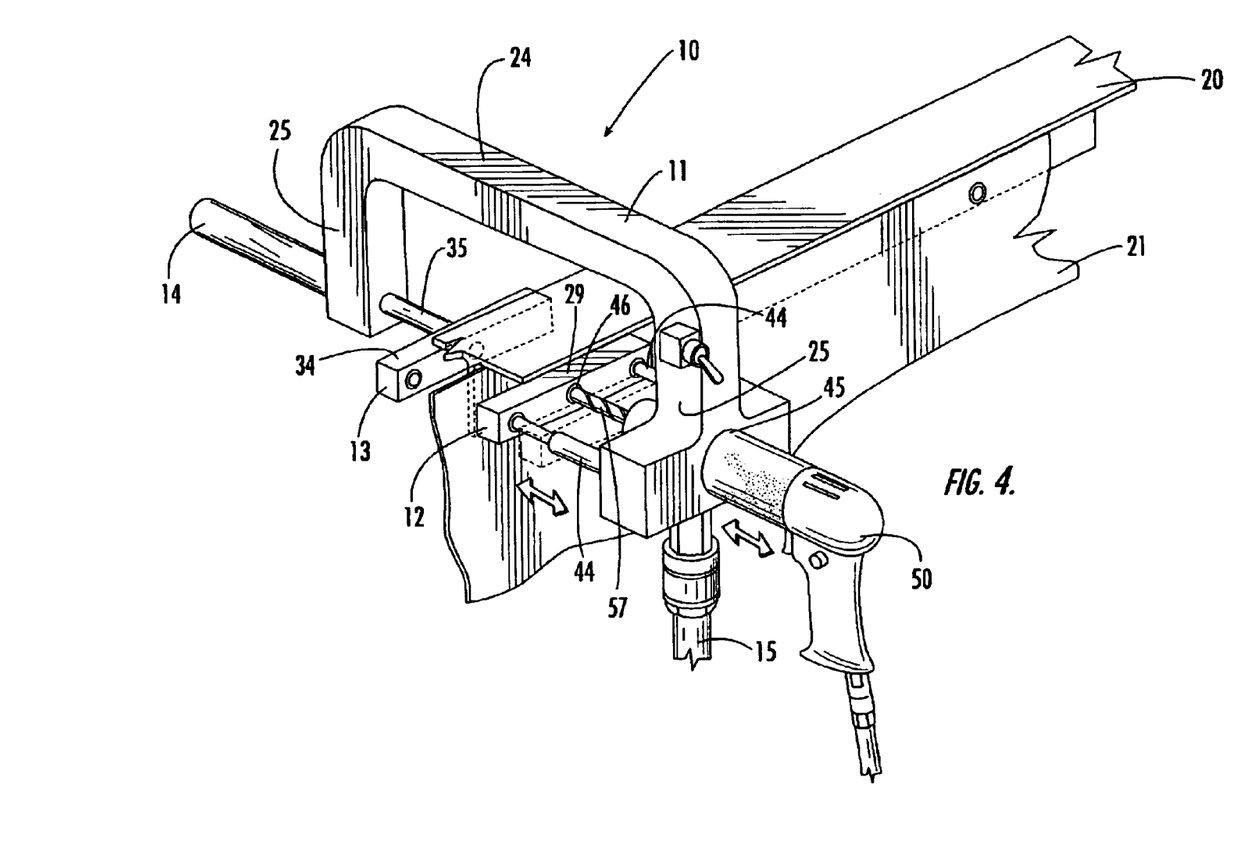
FIG. 4 is a perspective view of another embodiment of the powered clamp of the present invention including a drill opening in the clamp body allowing access through the body to a center drill bit assembly guide.

Another embodiment of the clamp assembly 10 of the present invention, further including a pair of second air cylinders 44, is shown in FIG. 4. The air cylinders 44 are each affixed at one end to the respective one of the end portions 25 and at an opposite end to the first compression foot 29. The one of the end portions 25 supporting the first compression member 12 is widened, in comparison to the embodiment of FIGS. 1–3, allowing the air cylinders 44 to be spaced apart. The increased width of the end portion also allows it to define a drill opening 45 centered between the pair of second air cylinders 44 and collinear with a centered drill bit assembly guide 46 defined by the first compression foot. The pair of second air cylinders 44 actuate the first compression foot 29 against the parts, preferably simultaneous with actuation of the second compression foot 34 by the air cylinder 14. After the clamp assembly 10 is secured and the flange 20 and sheet 21 are compressed together, a drill motor 50 can be inserted through the drill opening 45 and a drill bit 51 (or drill bit assembly if including a bushing) can be inserted through the centered drill bit guide 46. The drill bit 51 will exit through a hole at second compression foot 34 and co-linear with drill bit guide 46. Advantageously, the pair of second cylinders 44 allow for faster clamping action and the centered drill bit guide 46 is positioned for drilling in the area of maximum compression forces. Also, the same shop air used to operate the motor of the drill 50 is used to actuate the air cylinders. Although not shown, a bag, or other debris capturing device, can be fit around the drill and clamp assembly 10 to reduce the amount of debris released to the environment.

Another embodiment of the clamp assembly 10 of the present invention that further comprises a swing mount 54, an actuation linkage 55 and first and second compression feet 29, 34 that are rotatable, is shown in FIGS. 5–8. The swing mount 54 rotatably connects the second compression member 13 to the body 11 and allows the second compression member 13 to be retracted up and away from the clamp body 11 for deployment of the clamp over large part assemblies. The swing mount 54 has an "H" shape and includes a first pair of tabs 56 that embrace the adjacent portion of the second compression member 13, and also includes a second pair of tabs 57 that embrace the adjacent portion of the clamp body 11, as shown best in FIG. 5. The first pair of tabs 56 define a hole through which a pin is extended to rotatably attach the swing mount 54 to a second leg 33 of the second compression member 13. The second pair of tabs 57 similarly define a hole through which a release pin 58 extends to rotatably attach the swing mount 54 to the clamp body 11.

Figure 5:
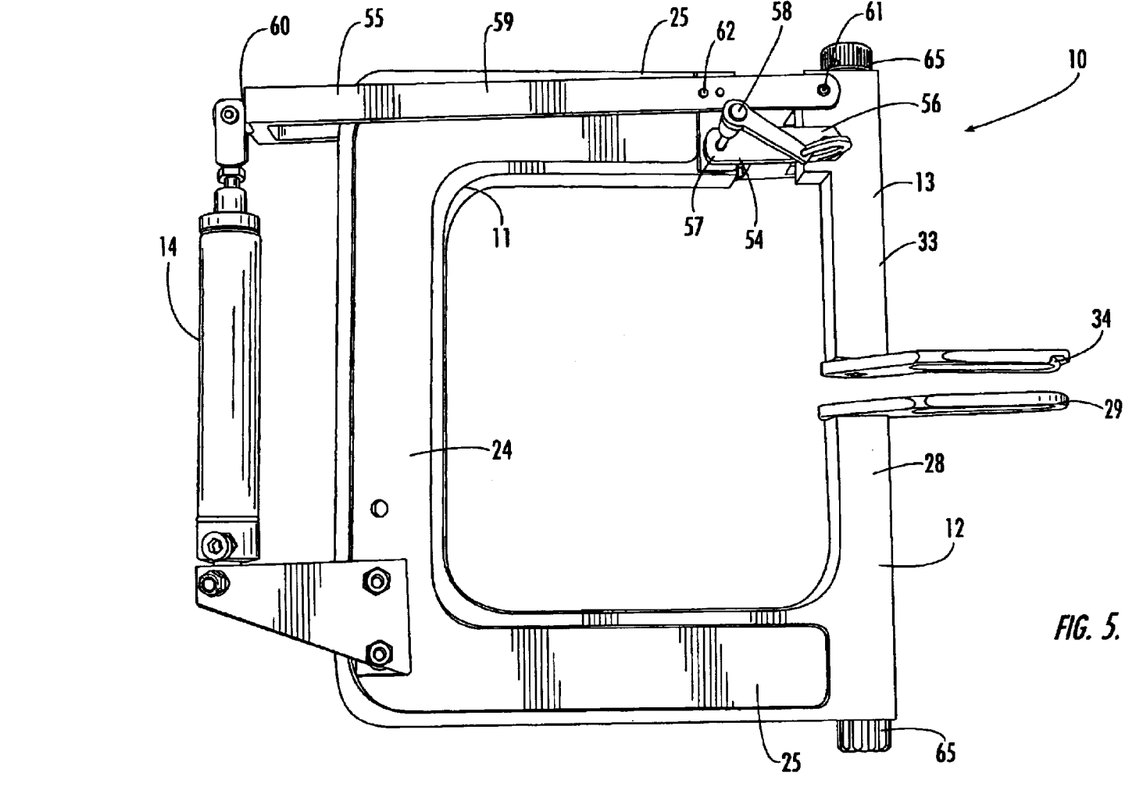
FIG. 5 is a side elevation view of yet another embodiment of a powered clamp of the present invention.

The linkage 55 operably connects the air cylinder 14 to the second compression member 13 so that the air cylinder can actuate the second compression member towards the first compression member 12. The linkage 55 includes a lever arm 59 that is rotatably attached at a first end 60 to the rod of the cylinder 14 and is rotatably attached at its second end 61 to the second leg 33 of the second compression member 13, adjacent to the attachment location of the first pair of tabs 56. The lever arm 59 pivots about a third rotatable attachment 62 to the clamp body 11 that is positioned some distance, such as roughly ¼ of the length of the lever arm, away from the attachment at the second end 61 to the second leg 33. Such positioning ensures that the mechanical advantage of the lever arm 59 increases the compression force generated by actuation of the cylinder 14.

Figure 7:
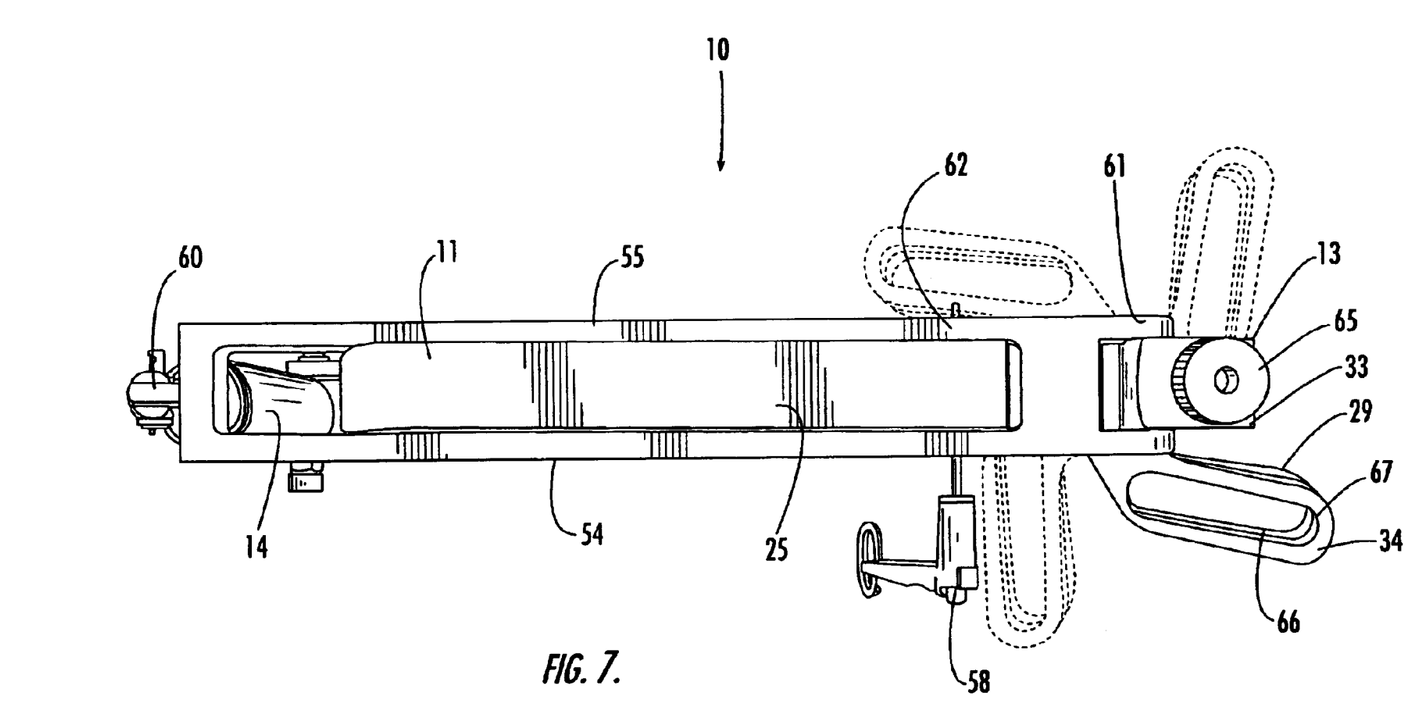
FIG. 7 is a plan view of the powered clamp of FIG. 6 showing rotation of each compression foot at an end of its respective leg.

As shown by the phantom lines in FIG. 7, each compression foot 29, 34 is rotatable about a long axis of its respective leg 28, 33 to allow the foot positioning to be adjusted for different overlapping part configurations. The position of each foot 29, 34 is adjusted by rotation of a respective one of a pair of control knobs 65. Each control knob is located on an opposite end of its leg 28, 33 from the attachment of the foot 29, 34. Each control knob 65 is preferably connected to its respective foot 29, 34 using a rod (not shown) extending through the hollow inner shaft of its respective leg 28, 33. Each compression foot 29, 34 is preferably offset from the axis of its respective leg 28, 33 a distance approximately equal to a hand and a pistol grip drill motor. Each compression foot 29, 34 defines a single drill bit assembly guide 66, 67, respectively, that has the shape of an elongated slot. The elongated slot shape matches the outer diameter of a traveler bushing which ensures that the hole is drilled perpendicular to the parts. Alternatively, each compression foot may define multiple drill bit assembly guides, allowing multiple drilling locations, as desired.

Figure 6:
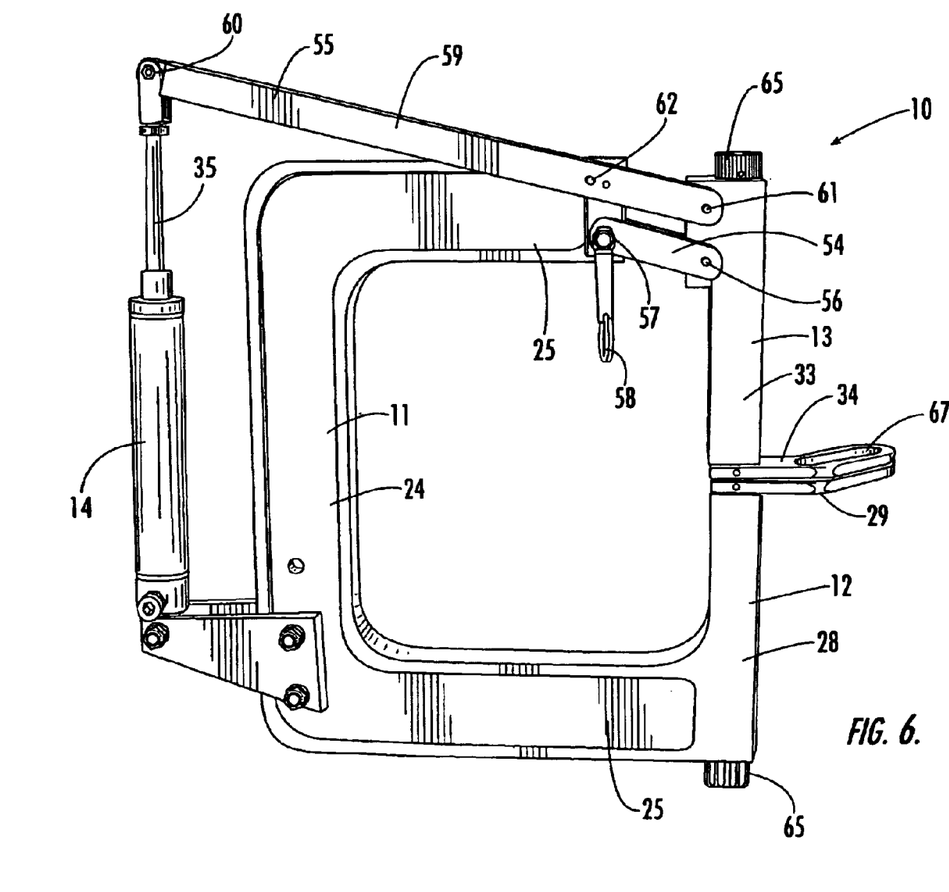
FIG. 6 is a side elevation view of the powered clamp of FIG. 5 including a second compression foot actuated towards a first compression foot.
Figure 8:
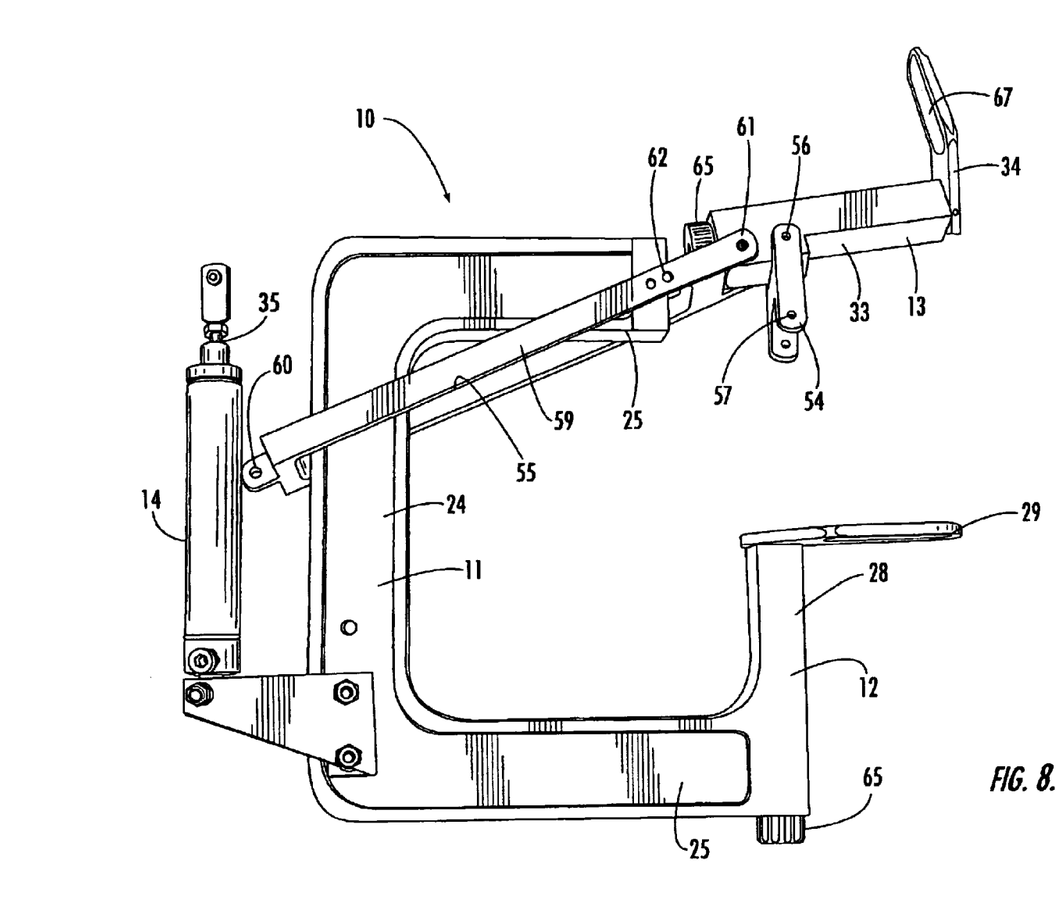
FIG. 8 is a side elevation view of the powered clamp of FIG. 5, with the second compression foot retracted from the first compression foot by partial disassembly of a swing mount.

During operation of the clamp assembly 10 the release pin 58 is removed which detaches the second pair of tabs 57 of the swing mount 54 from the clamp body 11, as shown in FIG. 8. The second compression member 13 is then free to be rotated away from the first compression member 12 about second end 61 of the lever arm 59. The rotation may be further aided by detachment of the first end 60 of the lever arm 59 from the air cylinder 14. Retraction of the second compression member 13 opens the clamp assembly 10, allowing it to engage parts with large intervening portions, such as the flange 20. The lever arm 59 and the swing mount 54 are reattached and a rotational position of the first and second compression foot 29, 34 is selected to accommodate the parts being clamped, as FIG. 7. The air cylinder 14 is pressurized and the clamp moves from an open position, as in FIG. 5, to a closed, clamping position, as shown in FIG. 6.

The present invention has several advantages. The clamp assembly 10 reduces the incidence of interlaminate burring by tightly clamping together the parts being drilled. In addition, the clamp is powered, which reduces operator fatigue. In particular, the air pressure cylinder 14 acts quickly and provides sufficiently high clamping forces to reduce burring. The drill bit assembly guides 30, 36 ensure that the holes are drilled in the area of pressure application and also ensure accurate positioning and orientation of the drill holes. The use of air pressure cylinders to actuate both of the compression members 12, 13 allows maximum clearance for positioning of the clamp 10 over large parts. The elongated foot shape of the compression members avoids damage to the parts from overly high pressure areas, as well as distributes the clamping pressure over a large area for the drilling of multiple holes without repositioning the clamp. The release pin 58 of the swing mount 54 allows the second compression member 13 to be rotated open for additional clearance to position the clamp 10 over large parts. The lever arm 59 of the linkage increases the force applied by the pressure cylinder to the second compression foot 34.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A pressure clamp assembly for clamping a plurality of overlapping members together and for facilitating accurate drilling of the overlapping members using a drill and a drill bit assembly, the pressure clamp assembly comprising:
    a clamp body;
    a first compression member having an elongated foot shape opposingly spaced from a second compression member and defining a gap, the compression members attached to the clamp body, at least one of the compression members movable toward the other one of the compression members, and at least the first compression member defining at least one drill bit assembly guide having an opening configured to receive and guide the drill bit assembly of the drill, said opening having an off-center positioning on the elongated foot; and
    a power source operable to drive the at least one movable compression member so as to shrink the gap and clampingly engage the plurality of overlapping members between the compression members with sufficient pressure to resist interlaminate burring during operation of the drill.

2. A pressure clamp assembly of claim 1, wherein the clamp body has a U-shape including a pair of free ends, and wherein the first compression member is attached to a first one of the free ends, and the second compression member is attached to a second one of the free ends.

3. A pressure clamp assembly of claim 2, wherein the power source includes a pressure cylinder connected to a fluid pressure supply.

4. A pressure clamp assembly of claim 3, wherein the second compression member is connected to a free end of a piston shaft of the pressure cylinder, and is moveable thereby in the direction of the first compression member.

5. A pressure clamp assembly for clamping a plurality of overlapping members together and for facilitating accurate drilling of the overlapping members using a drill and a drill bit assembly, the pressure clamp assembly comprising:
a clamp body;
a first compression member having an elongated foot shape opposingly spaced from a second compression member and defining a gap, the compression members attached to the clamp body, at least one of the compression members movable toward the other one of the compression members, and at least the first compression member defining at least one drill bit assembly guide configured to receive and guide the drill bit assembly of the drill; and
a power source operable to drive the at least one movable compression member so as to shrink the gap and clampingly engage the plurality of overlapping members between the compression members with sufficient pressure to resist interlaminate burring during operation of the drill wherein the power source includes a pair of second pressure cylinders connected to the pressure supply, and wherein the first compression member is connected to a free end of a piston shaft of each of the second pressure cylinders, and is movable thereby in the direction of the second compression member.

6. A pressure clamp assembly of claim 5, wherein the pair of second pressure cylinders are spaced apart across the first compression member, and wherein the drill bit assembly guide is defined by the compression member between the pair of second pressure cylinders, and wherein the first one of the free ends of the body defines a drill opening configured to allow access of the drill through the first one of the free ends to the drill assembly guide.

7. A pressure clamp assembly for clamping a plurality of overlapping members together and for facilitating accurate drilling of the overlapping members using a drill and a drill bit assembly, the pressure clamp assembly comprising:
a clamp body;
a first compression member having an elongated foot shape opposingly spaced from a second compression member and defining a gap, the compression members attached to the clamp body, at least one of the compression members movable toward the other one of the compression members, and at least the first compression member defining at least one drill bit assembly guide configured to receive and guide the drill bit assembly of the drill wherein the first compression member further defines a second drill bit assembly guide, the guides spaced apart across the elongated foot shape and wherein the second compression member is connected to a free end of a piston shaft of the pressure cylinder, and is moveable thereby in the direction of the first compression member;
wherein the clamp body has a U-shape including a pair of free ends, and wherein the first compression member is attached to a first one of the free ends, and the second compression member is attached to a second one of the free ends; and
a power source operable to drive the at least one movable compression member so as to shrink the gap and clampingly engage the plurality of overlapping members between the compression members with sufficient pressure to resist interlaminate burring during operation of the drill wherein the power source includes a pressure cylinder connected to a fluid pressure supply.

8. A pressure clamp assembly for clamping a plurality of overlapping members together and for facilitating accurate drilling of the overlapping members using a drill and a drill bit assembly, the pressure clamp assembly comprising:
a clamp body;
a first compression member having an elongated foot shape opposingly spaced from a second compression member and defining a gap, the compression members attached to the clamp body, at least one of the compression members movable toward the other one of the compression members, and at least the first compression member defining at least one drill bit assembly guide configured to receive and guide the drill bit assembly of the drill;
a power source operable to drive the at least one movable compression member so as to shrink the gap and clampingly engage the plurality of overlapping members between the compression members with sufficient pressure to resist interlaminate burring during operation of the drill; and
a swing mount assembly, the swing mount assembly connecting the second compression member to the body and allowing the second compression member to swing with respect to the body and the first compression member.

9. A pressure clamp assembly of claim 8, wherein the second compression member includes a second elongated compression foot defining a second drill bit assembly guide.

10. A pressure clamp assembly of claim 9, wherein the power source includes a pressure cylinder connected to a fluid pressure supply.

11. A pressure clamp assembly of claim 10, wherein the power source further includes a linkage attaching a rod of the pressure cylinder to the second compression member for driving the second compression member in rotation about the swing mount assembly.

12. A pressure clamp assembly of claim 11, wherein the linkage includes a lever arm rotatably attached at a first end to the rod of the cylinder, rotatably attached at a second end to the second compression member and rotatably attached between the first and second ends to the body.

13. A pressure clamp assembly of claim 12, wherein the swing mount is configured to be detachable from the body via a quick-release pin so as to allow the second compression member to rotate freely about the second end of the lever arm.

14. A pressure clamp assembly of claim 9, wherein the first compression member further includes a first leg attached at one end to the body and extending towards the second compression member and attached at the other end to the first compression foot and wherein the second compression member includes a second leg and a second compression foot, wherein the second leg is attached at one end to the body and extends towards the first compression member, to attach at the other end to the second compression foot.

15. A pressure clamp assembly of claim 14, wherein the first compression foot is rotatable about a long axis of the first leg, wherein the second compression foot is rotatable about a long axis of the second leg and wherein the first compression foot is parallel to the second compression foot across the gap.

16. A pressure clamp assembly of claim 1, wherein the elongated foot shape extends outwards from a plane defined by a long axis of the clamp body.

17. A pressure clamp assembly for clamping a plurality of overlapping members together and for facilitating accurate drilling of the overlapping members using a drill and a drill bit assembly, the pressure clamp assembly comprising:

a clamp body;

a first compression member having an elongated foot shape opposingly spaced from a second compression member and defining a gap, the compression members attached to the clamp body, at least one of the compression members movable toward the other one of the compression members, and at least the first compression member defining at least one drill bit assembly guide configured to receive and guide the drill bit assembly of the drill wherein the drill bit assembly guide is offset along the elongated foot shape at least a width of the drill from the clamp body; and a power source operable to drive the at least one movable compression member so as to shrink the gap and clampingly engage the plurality of overlapping members between the compression members with sufficient pressure to resist interlaminate burring during operation of the drill.

18. A method of clamping a plurality of overlapping parts together to facilitate drilling with a drill and drill bit assembly, the method of clamping comprising:

positioning a body of the clamp over the overlapping parts so that a first compression foot and a second compression foot attached to the clamp body are opposingly spaced on either side of the overlapping parts;

advancing the second compression foot toward the overlapping parts and the first compression foot so as to compress the overlapping parts between the compression feet and inhibit the formation of burrs between the overlapping parts during drilling; and inserting a drill bit assembly into an opening defined in a drill bit assembly guide supported by one of the compression feet wherein the opening has an off-center positioning on the one of the compression feet and drilling a hole through the overlapping parts.

19. A method of clamping of claim 18, wherein advancing the second compression foot includes advancing the second foot with air pressure.

20. A method of clamping of claim 18, further comprising advancing the first compression foot toward the overlapping parts and the second compression foot while advancing the second compression foot.

21. A method of clamping a plurality of overlapping parts together to facilitate drilling with a drill and drill bit assembly, the method of clamping comprising:

swinging a second compression foot away from a first compression foot about a swing mount;

positioning a body of the clamp over the overlapping parts so that the first compression foot and the second compression foot attached to the clamp body are opposingly spaced on either side of the overlapping parts;

advancing the second compression foot toward the overlapping parts and the first compression foot so as to compress the overlapping parts between the compression feet and inhibit the formation of burrs between the overlapping parts during drilling; and inserting a drill bit assembly into a drill bit assembly guide defined by one of the compression feet and drilling a hole through the overlapping parts.

22. A method of clamping of claim 21, wherein advancing the second compression foot includes rotating the second compression foot about the swing mount in the direction of the first compression foot.

23. A method of clamping of claim 22, wherein rotating the second compression foot includes actuating a first end of a lever arm using a pressure cylinder and thereby moving a second end of the lever arm attached to the second compression foot.

24. A method of clamping of claim 21, further comprising repositioning the first compression foot and the second compression foot relative to the clamp body after positioning the body of the clamp.

* * * * *